United States Patent
Haywood et al.

(10) Patent No.: US 8,805,718 B2
(45) Date of Patent: Aug. 12, 2014

(54) SYSTEMS AND METHODS FOR COLLECTING INSURANCE-RELATED DATA

(75) Inventors: John C. Haywood, Camby, IN (US);
Maureen A. Morrison, Plainfield, IN (US); Joseph E. Musgrove, Jr., Noblesville, IN (US); Jeffrey D. Panitzke, Glenwood, MN (US); Sheila M. Peine, Zionsville, IN (US); Andres Pelaez, Westfield, IN (US); Ryan L. Wilson, Noblesville, IN (US)

(73) Assignee: Hartford Fire Insurance Company, Hartford, CT (US)

( * ) Notice: Subject to any disclaimer, the term of this patent is extended or adjusted under 35 U.S.C. 154(b) by 649 days.

(21) Appl. No.: 12/836,886

(22) Filed: Jul. 15, 2010

(65) Prior Publication Data

US 2012/0016693 A1 Jan. 19, 2012

(51) Int. Cl.
*G06Q 40/08* (2012.01)
(52) U.S. Cl.
CPC ...................................... *G06Q 40/08* (2013.01)
USPC .......................................................... 705/14
(58) Field of Classification Search
CPC ..................................................... G06Q 40/08
See application file for complete search history.

(56) References Cited

U.S. PATENT DOCUMENTS

| | | | | |
|---|---|---|---|---|
| 7,181,304 | B2* | 2/2007 | Key | 700/100 |
| 7,627,391 | B2* | 12/2009 | Key | 700/100 |
| 2002/0007289 | A1* | 1/2002 | Malin et al. | 705/4 |
| 2002/0091550 | A1* | 7/2002 | White et al. | 705/4 |
| 2005/0209892 | A1* | 9/2005 | Miller | 705/4 |
| 2009/0144095 | A1* | 6/2009 | Shahi et al. | 705/4 |
| 2010/0305977 | A1* | 12/2010 | Hogan et al. | 705/4 |
| 2011/0313794 | A1* | 12/2011 | Feeney | 705/4 |

OTHER PUBLICATIONS

Software Application Screenshots, pp. 1-9 (redacted). Prepared Sep. 14, 2011.

* cited by examiner

*Primary Examiner* — Bruce I Ebersman
(74) *Attorney, Agent, or Firm* — Howard IP Law Group, PC

(57) ABSTRACT

Systems and methods are disclosed herein for collecting and processing auto insurance claim-related data. Initial data is collected from a customer or a third party appraiser via a user interface. The initial data is used to retrieve relevant compliance guideline and policy information, which is used to modify and/or populate fields in the user interface. Collected and/or retrieved information is then stored and/or used to adjust an insurance claim workflow process.

21 Claims, 12 Drawing Sheets

400

402

*CCERT TOOL 1.0*

CCERT *Tool*
Version 1.0 — 404
Reset  Copy

Coverage
- State:
- Policy Type:
- Type of Loss:
- Daily Rental Lm: $
- Loss Rental Lm: $
- Policy Status:
- Veh Listed:
- Policy Ded: $
- EVP: $
- CRSP Waiver: $
- Applicable Ded: $

- Driveable: ○ Yes ○ No
- Hit and Run: ○ Yes ○ No    UMPD on Policy: ○ Yes ○ No    ID on HR Vehicle: ○ Yes ○ No
- Parked: ○ Yes ○ No    Passengers: ○ Yes ○ No    Damage to other Property: ○ Yes ○ No
- PTL: ○ Yes ○ No    Weather Related: ○ Yes ○ No

Compliance — 406

Estimator Source
- Estimate Source:    Status:

Rental
- Rental Need:

Action
- I made verbal contact: ○ Yes ○ No
- I sent introductory e-mail: ○ Yes ○ No
- I sent Claim Process letters: ○ Yes ○ No
- I left Voice mail: ○ Yes ○ No Action Notes:

To Do

*Closing Macro*

SYSTEMS AND METHODS FOR COLLECTING INSURANCE-RELATED DATA

BACKGROUND OF THE INVENTION

Many insurance companies write insurance policies for multiple jurisdictions. Different jurisdictions may have different laws and regulations regarding insurance compliance, and it may be difficult for insurance companies offering products in multiple jurisdictions to consistently make sure that all the compliance guidelines are followed. Also, since some insurance companies also utilize employees and contractors that service multiple jurisdictions, it is difficult for such employees and contractors to determine the types of information that need to be collected when interacting with different claimants from different jurisdictions and the specific service guidelines that may apply. For example, different jurisdictions require a wide variety of questions be answered by claimants during the claims process. The questions vary in both number and substance. With respect to coverage issues, some jurisdictions allow for deductible waivers, but not all do. As another example, different jurisdictions also have different regulations regarding the allowability of repairing vehicles using after market parts. Different jurisdictions also require varying levels of reporting to claimants throughout the claims process. These are just a few of a myriad of examples of the ways in which automobile insurance regulations vary from jurisdiction to jurisdiction.

Adding to the challenge of providing consistent service from a limited number of service personnel, most insurance companies offer a variety of insurance policies, even covering the same perils. For example, an insurer may offer several automobile policies, some of which might offer rental car coverage while others do not. Some policies require an insured to use a predetermined set of repair service providers. Other policies provide customers more flexibility. Thus, to effectively service claims, insurance customer service personnel and claims handlers need to have ready access to the provisions of each claimant's policy in addition to the various jurisdictional guidelines.

Moreover, it may be difficult for insurance companies to consolidate claims information to determine exactly what information has been collected and what information is needed to comply with insurance guidelines.

SUMMARY OF THE INVENTION

Systems and methods are disclosed herein for collecting and processing auto insurance claim-related data. Initial data is collected from a customer or a third party appraiser via a user interface. The initial data is used to retrieve relevant compliance guideline and policy information, which is used to modify and/or populate fields in the user interface. Collected and/or retrieved information is then stored and/or used to adjust an insurance claim workflow process. This streamlines the auto insurance claim workflow process, by ensuring that information relevant for claim resolution and required by regulation is collected from the claimant and/or third parties, simplifying interactions and claims transfers between different claim departments in an insurance company, and providing standardized user interfaces and output data formats.

In one aspect, the invention relates to a system for managing an auto insurance claim workflow for a claims department with multiple claims processing tool applications. The system includes a processor and first and second data stores for storing auto insurance compliance guidelines for multiple jurisdictions and policy data for multiple auto insurance policies, respectively. The processor is configured to use a first claims processing tool application to output an auto insurance data collection user interface for display on a display device, with one or more data fields requesting information about an auto insurance claim. The processor, with the first claims processing tool application, receives first data associated with the claim via the user interface, retrieves auto insurance compliance guidelines applicable to the claim from the first data store based on the first data, and modifies the user interface by adding and/or removing data fields based on the first data and the compliance guidelines. The processor also retrieves policy data applicable to the claim from the second data store based on the first data, populates data fields in the user interface with the retrieved policy data, and outputs the first data. The processor then uses a second claims processing tool application to retrieve a portion of the first data.

The claims processing tool applications may include a call center application, an appraisal application, an instruction determination application, and/or a compliance calculator. In some embodiments, the policy data includes policy holder data, claims data, and/or policy provision data. The processor may store data collected via the user interface to the second data store in a common data format. The second data store may include multiple databases, which may include a policy holder information database, a policy provisions database, and/or a claims information database. In certain embodiments, the processor determines a compliance score based on the retrieved compliance guidelines and the output data. The processor may adjust an auto insurance claim workflow based on the output data, and may do so by transferring the claim to a different claims department and/or providing recommendations for next steps in the workflow, which may include items in a to-do list. In certain embodiment, the processor is configured to modify a relationship with a vendor, an employee, and/or a service provider based on a compliance score.

In another aspect, the invention relates to methods and computer readable medium storing computer executable instructions that cause a processor to carry out methods for managing an auto insurance claim workflow for a claims department, as described above.

BRIEF DESCRIPTION OF THE FIGURES

The methods and systems may be better understood from the following illustrative description with reference to the following drawings in which:

FIG. 4 depicts a first user interface display for collecting and processing auto insurance claim-related data, according to an illustrative embodiment of the invention;

FIGS. 6A-F depict various user interface displays for collecting and processing auto insurance claim-related data from appraisers, according to an illustrative embodiment of the invention; and FIG. 7 depicts a user interface display for determining auto insurance claim guideline compliance, according to an illustrative embodiment of the invention.

DETAILED DESCRIPTION

To provide an overall understanding of the invention, certain illustrative embodiments will now be described, including systems and methods for collecting information about and processing auto insurance claims. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

Systems and methods are disclosed herein for collecting and processing auto insurance claim-related data. Initial data is collected from a customer or a third party appraiser via a user interface. The initial data is used to retrieve relevant compliance guideline and policy information, which is used to modify and/or populate fields in the user interface. Collected and/or retrieved information is then stored and/or used to adjust an insurance claim workflow process. This streamlines the auto insurance claim workflow process, by ensuring that information relevant for claim resolution and required by regulation is collected from the claimant and/or third parties, simplifying interactions and claims transfers between different claim departments in an insurance company, and providing standardized user interfaces and output data formats.

Figure 1:
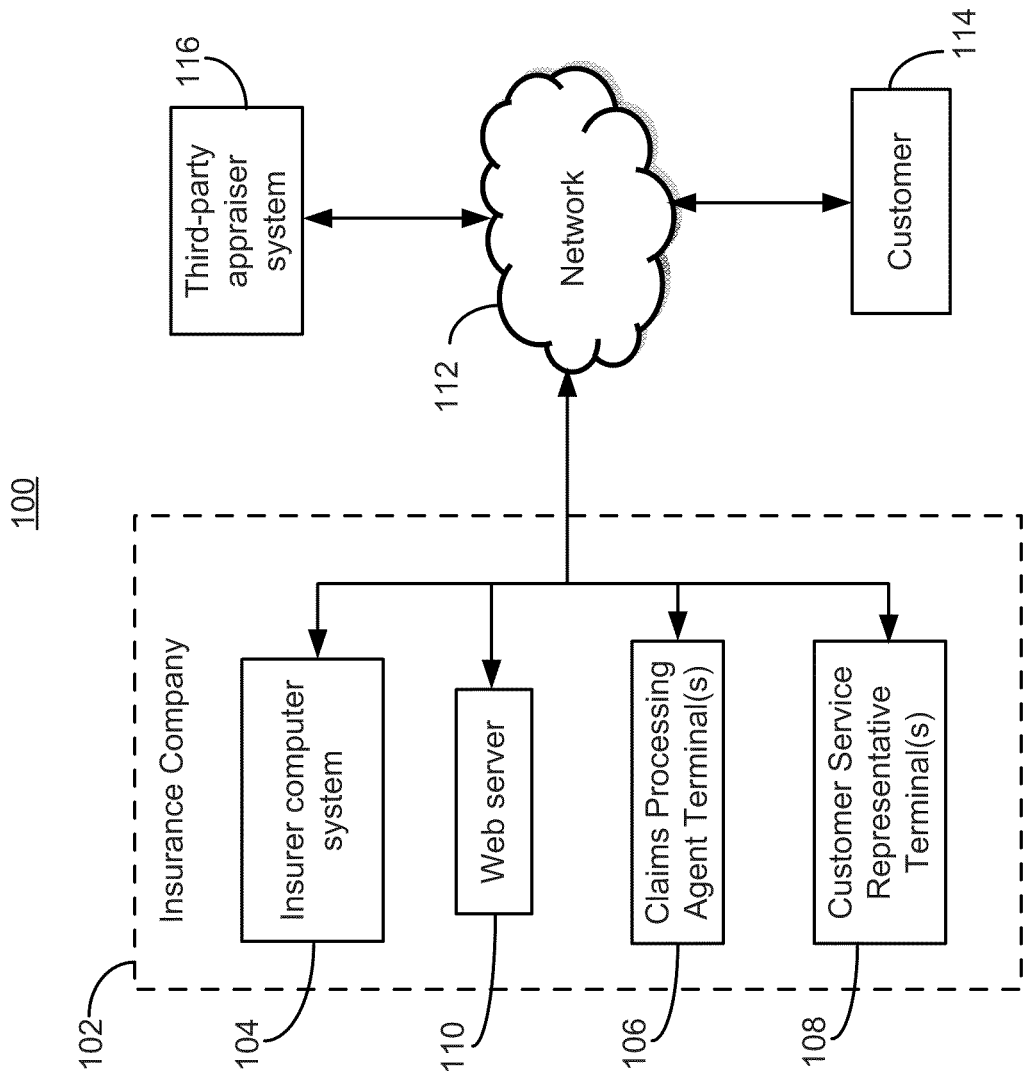
FIG. 1 is a block diagram of an insurance computer network, according to an illustrative embodiment of the invention.

FIG. 1 is a block diagram of an insurance computer network 100, according to an illustrative embodiment of the invention. The insurance computer network 100 includes an insurance company 102 with an insurer computer system 104, claims processing agent terminal(s) 106, customer service representative terminal(s) 108, and a web server 110. The customer service representative terminal(s) 106 and/or the claims processing agent terminal(s) 106 may be operated by employees of the insurance company, and are linked to the insurer computer system 104. In some embodiments, the claims processing agent terminal(s) 106 are distributed across multiple claims departments in the insurance company 102. The insurance company 102, its computer system 104, the customer service representative terminal(s) 108, the claims processing agent terminal(s) 106, and/or its web server 110 are linked, via network 112, to one or more customers 114 and a third-party appraiser system 116. The network 112 may be the Internet or a public-switched telephone network (PSTN).

In some embodiments, different networks are used to link different components of the insurance computer network 100 together. For example, the systems associated with the insurance company 102, such as the insurer computer system 104, the web server 110, and the claims processing agent/customer service representative terminals 106/108, may be linked to each other via a private data network. In these embodiments, the insurance company 100 and/or one or more of its components are then linked to external systems and components via a public network such as the Internet or a PSTN. For example, a customer 114 may place a call to a customer service representative terminal 108 via the public network 112. The customer service representative terminal 108, after receiving the call from the customer 114, may retrieve relevant prospect information from the insurer computer system 102 via the private data network. Similarly, if the customer 114 or the third party appraiser system 116 accesses a webpage served by the web server 110 on the public network 112, the web server 110 may also retrieve and/or transmit data to the insurer computer system 102 via the private data network.

Figure 2:
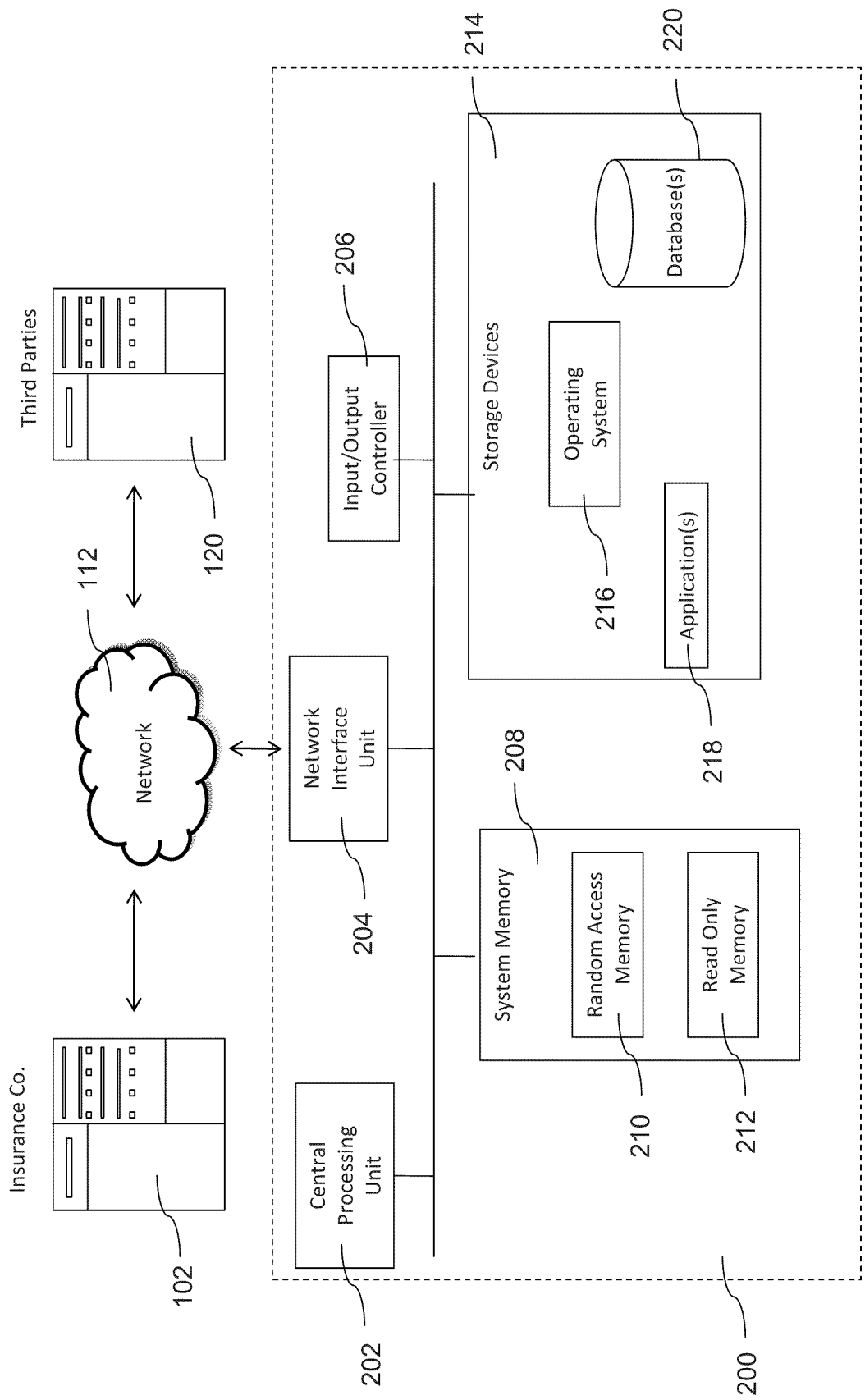
FIG. 2 is a block diagram of a computer system in the insurance computer network of FIG. 1, according to an illustrative embodiment of the invention.

FIG. 2 is a block diagram of a computer system 200 in the insurance computer network of FIG. 1, according to an illustrative embodiment of the invention. Computer system 200 comprises at least one central processing unit (CPU) 202, system memory 208, which includes at least one random access memory (RAM) 210 and at least one read-only memory (ROM) 212, at least one network interface unit 204, an input/output controller 206, and one or more data storage devices 214. All of these latter elements are in communication with the CPU 202 to facilitate the operation of the computer system 200. The computer system 200 may be configured in many different ways. For example, computer system 200 may be a conventional standalone computer or alternatively, the function of computer system 200 may be distributed across multiple computing systems and architectures. In the embodiment shown in FIG. 2, the computer system 200 is linked, via network 112 (also described in FIG. 1), to an insurance company computer system 102 and one or more third party computer systems 120.

Computer system 200 may be configured in a distributed architecture, wherein databases and processors are housed in separate units or locations. Some such units perform primary processing functions and contain at a minimum, a general controller or a processor 202 and a system memory 208. In such an embodiment, each of these units is attached via the network interface unit 204 to a communications hub or port (not shown) that serves as a primary communication link with other servers, client or user computers and other related devices. The communications hub or port may have minimal processing capability itself, serving primarily as a communications router. A variety of communications protocols may be part of the system, including but not limited to: Ethernet, SAP, SAS™, ATP, BLUETOOTH™, GSM and TCP/IP.

The CPU 202 comprises a processor, such as one or more conventional microprocessors and one or more supplementary co-processors such as math co-processors. The CPU 202 is in communication with the network interface unit 204 and the input/output controller 206, through which the CPU 202 communicates with other devices such as other servers, user terminals, or devices. The network interface unit 204 and/or the input/output controller 206 may include multiple communication channels for simultaneous communication with, for example, other processors, servers or client terminals. Devices in communication with each other need not be continually transmitting to each other. On the contrary, such devices need only transmit to each other as necessary, may actually refrain from exchanging data most of the time, and may require several steps to be performed to establish a communication link between the devices.

The CPU 202 is also in communication with the data storage device 214. The data storage device 214 may comprise an appropriate combination of magnetic, optical and/or semiconductor memory, and may include, for example, RAM, ROM, flash drive, an optical disc such as a compact disc and/or a hard disk or drive. The CPU 202 and the data storage device 214 each may be, for example, located entirely within a single computer or other computing device; or connected to each other by a communication medium, such as a USB port, serial port cable, a coaxial cable, an Ethernet type cable, a telephone line, a radio frequency transceiver or other similar wireless or wired medium or combination of the foregoing. For example, the CPU 202 may be connected to the data storage device 214 via the network interface unit 204.

The data storage device 214 may store, for example, (i) an operating system 216 for the computer system 200; (ii) one or more applications 218 (e.g., computer program code and/or a computer program product) adapted to direct the CPU 202 in accordance with the present invention, and particularly in accordance with the processes described in detail with regard to the CPU 202; and/or (iii) database(s) 220 adapted to store information that may be utilized to store information required by the program. In some embodiments, the database(s) 220 includes a database storing auto insurance compliance guidelines for one or more jurisdictions, a database storing policy holder information, a database storing policy provisions for one or more different types of insurance policies, and/or a database storing claims information.

The operating system 216 and/or applications 218 may be stored, for example, in a compressed, an uncompiled and/or an encrypted format, and may include computer program code. The instructions of the program may be read into a main memory of the processor from a computer-readable medium other than the data storage device 214, such as from the ROM 212 or from the RAM 210. While execution of sequences of instructions in the program causes the processor 202 to perform the process steps described herein, hard-wired circuitry may be used in place of, or in combination with, software instructions for implementation of the processes of the present invention. Thus, embodiments of the present invention are not limited to any specific combination of hardware and software.

Suitable computer program code may be provided for performing numerous functions such as generating dynamic driver profiles, evaluating driver behavior, selecting feedback modes, and generating feedback. The program also may include program elements such as an operating system, a database management system and "device drivers" that allow the processor to interface with computer peripheral devices (e.g., a video display, a keyboard, a computer mouse, etc.) via the input/output controller 206.

The term "computer-readable medium" as used herein refers to any medium that provides or participates in providing instructions to the processor of the computing device (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other medium from which a computer can read.

Various forms of computer readable media may be involved in carrying one or more sequences of one or more instructions to the processor 202 (or any other processor of a device described herein) for execution. As used herein, the term computer readable media refers to non-transitory computer readable media, including, magnetic, optical, magneto-optical, integrated circuit, holographic media. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Figure 3:
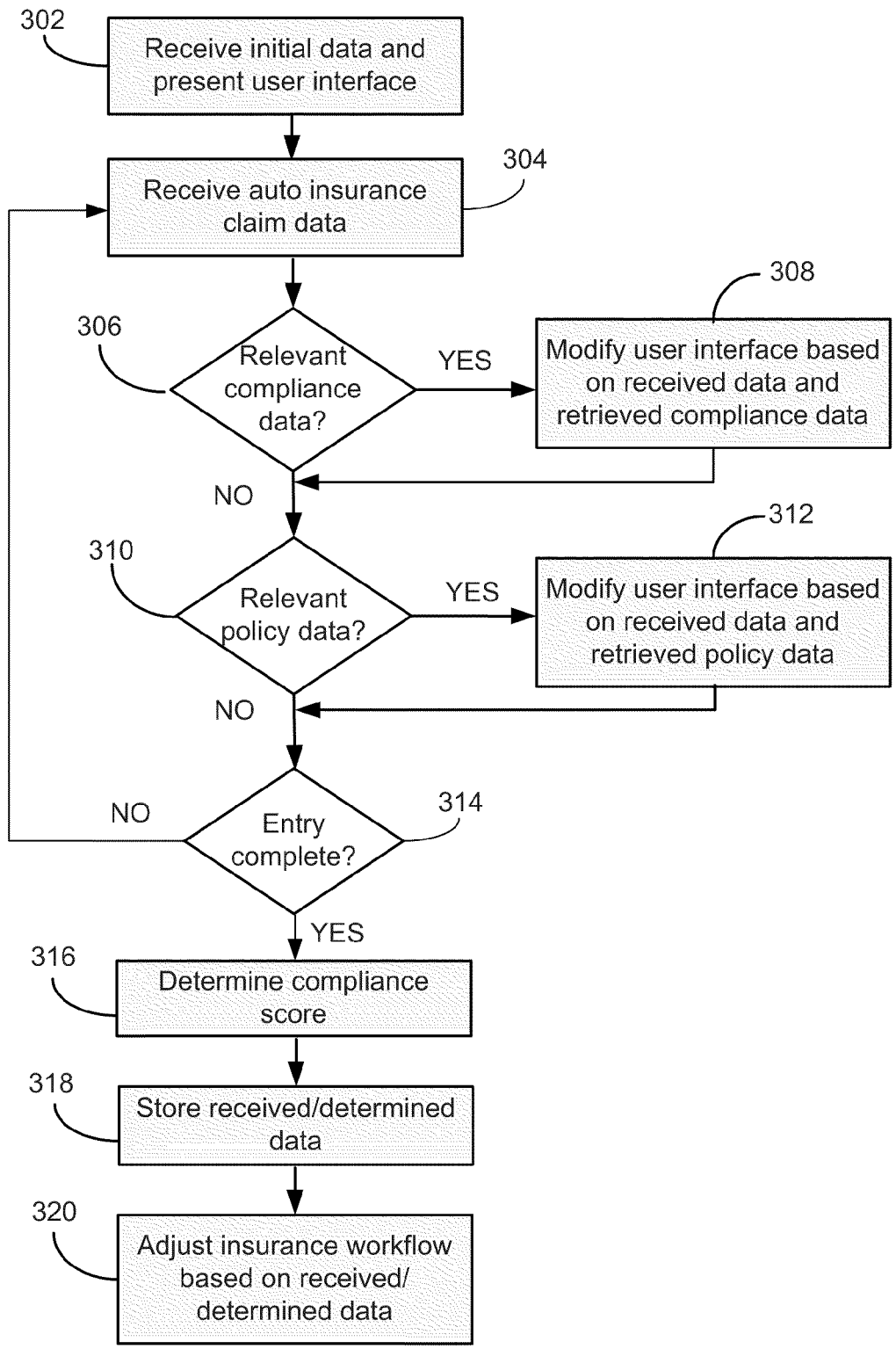
FIG. 3 is a flowchart depicting a workflow adjustment process for collecting and processing auto insurance claim-related data, according to an illustrative embodiment of the invention.
Figure 5:
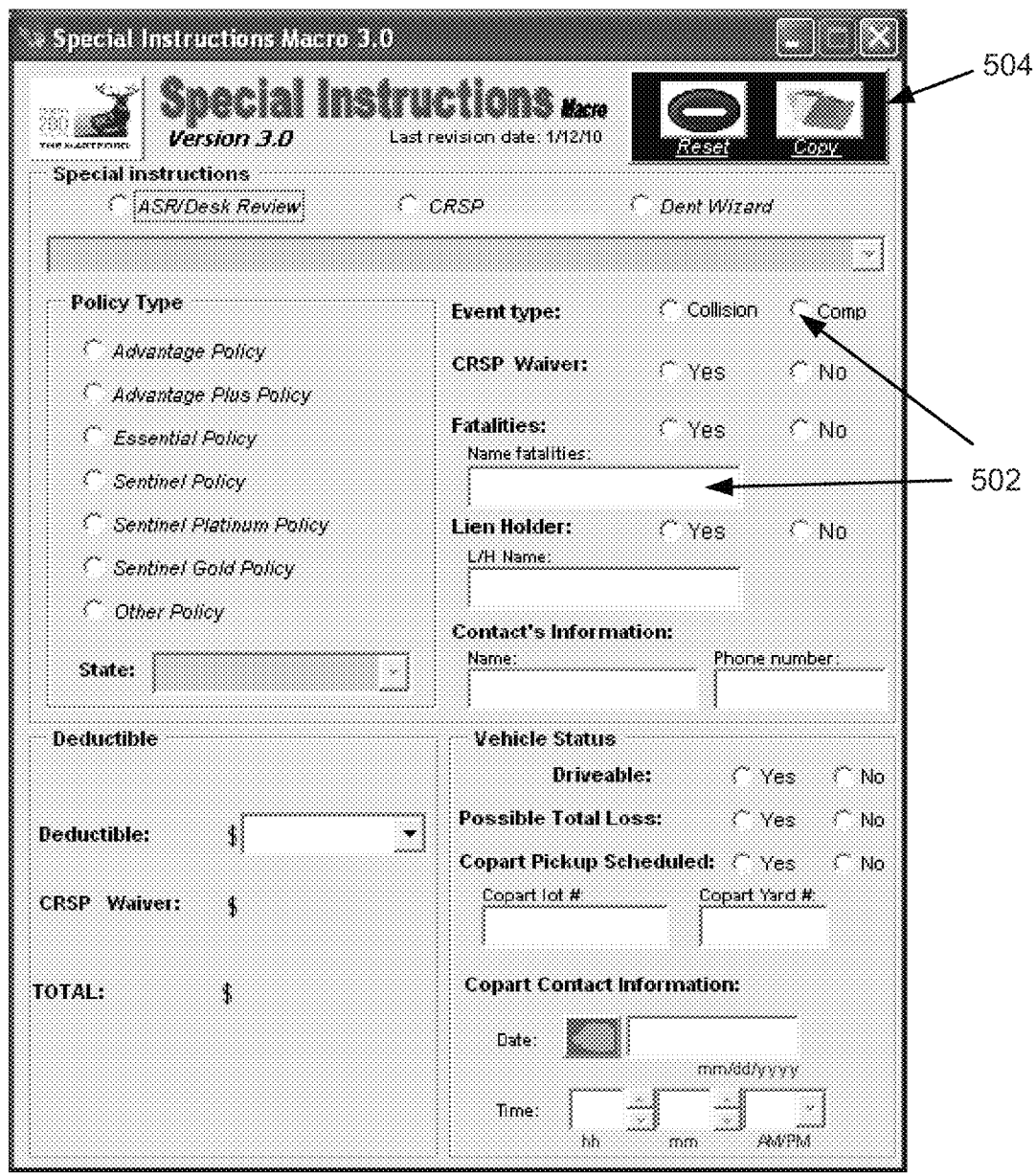
FIG. 5 depicts a second user interface display for collecting and processing auto insurance claim-related data, according to an illustrative embodiment of the invention.

FIG. 3 is a flowchart depicting a workflow adjustment process 300 for collecting and processing auto insurance claim-related data. The workflow adjustment process 300 may be performed by a computer system, such as insurer computer system 104 (FIG. 1). In step 302, the system receives initial data about an auto insurance claim and generates/presents a user interface based on the received auto insurance claim data. The initial data about an auto insurance claim may include information such as the name of the claimant, the geographic locale in which the claimed incident occurred (e.g. state), and/or the type of auto insurance policy the claimant has. The generated user interface may be presented to employees in different departments of an insurance company. For example, the user interface may be presented, via customer service representative terminal 108, to a customer service representative in contact with a customer 114. As another example, the user interface may be presented, via claims processing agent terminal 106, to a claims processing agent/representative who is processing the particular claim. FIGS. 4 and 5 depict user interfaces that may be presented to a customer service representative and/or a claims processing agent. Optionally, the generated user interface may be presented to third-party entities. For example, the user interface may be presented to a third party appraiser appraising claimed damage to an auto on behalf of the insurance company 102. FIGS. 6A-F depict user interfaces that may be presented to a third party entity such as an appraiser. Optionally, the user interfaces of FIGS. 6A-F may be presented to an in-house appraiser for insurance company 102. Some user interfaces, such as user interface 600 (FIG. 6B) may provide user access to other user interfaces, such as user interface 608, via selection of option 606.

In step 304, the system receives first auto insurance claim data via the user interface. For example, a customer service representative, in response to comments from a claimant, may fill in data fields in the user interface (e.g., the "State" field in the user interface of FIG. 4) with information. As another example, a claims processing agent or other user may fill in data fields in the user interface (e.g., data field 402 in FIG. 4, data field 502 in FIG. 5, or data field 602 in FIG. 6A) with information from a customer service representative. In step 306, the system determines if there are auto insurance compliance guidelines that are relevant to the auto insurance claim. The relevance of particular compliance guidelines may be based on the jurisdiction (e.g., state) the claimant resides in or the jurisdiction the incident occurred in. In general, different states have different compliance requirements that an auto insurer must follow. For example, some states require that an insurer provide the customer with a copy of repair estimates, and that any use of after market parts be explicitly disclosed to the customer. Other states do not. Auto insurance compliance guidelines for one or more jurisdictions are stored in one or more databases in the computer system, for example, in database(s) 220 (FIG. 2). In some embodiments, auto insurance compliance guidelines may also (or instead) be stored on a third party server or database.

Figure 7:
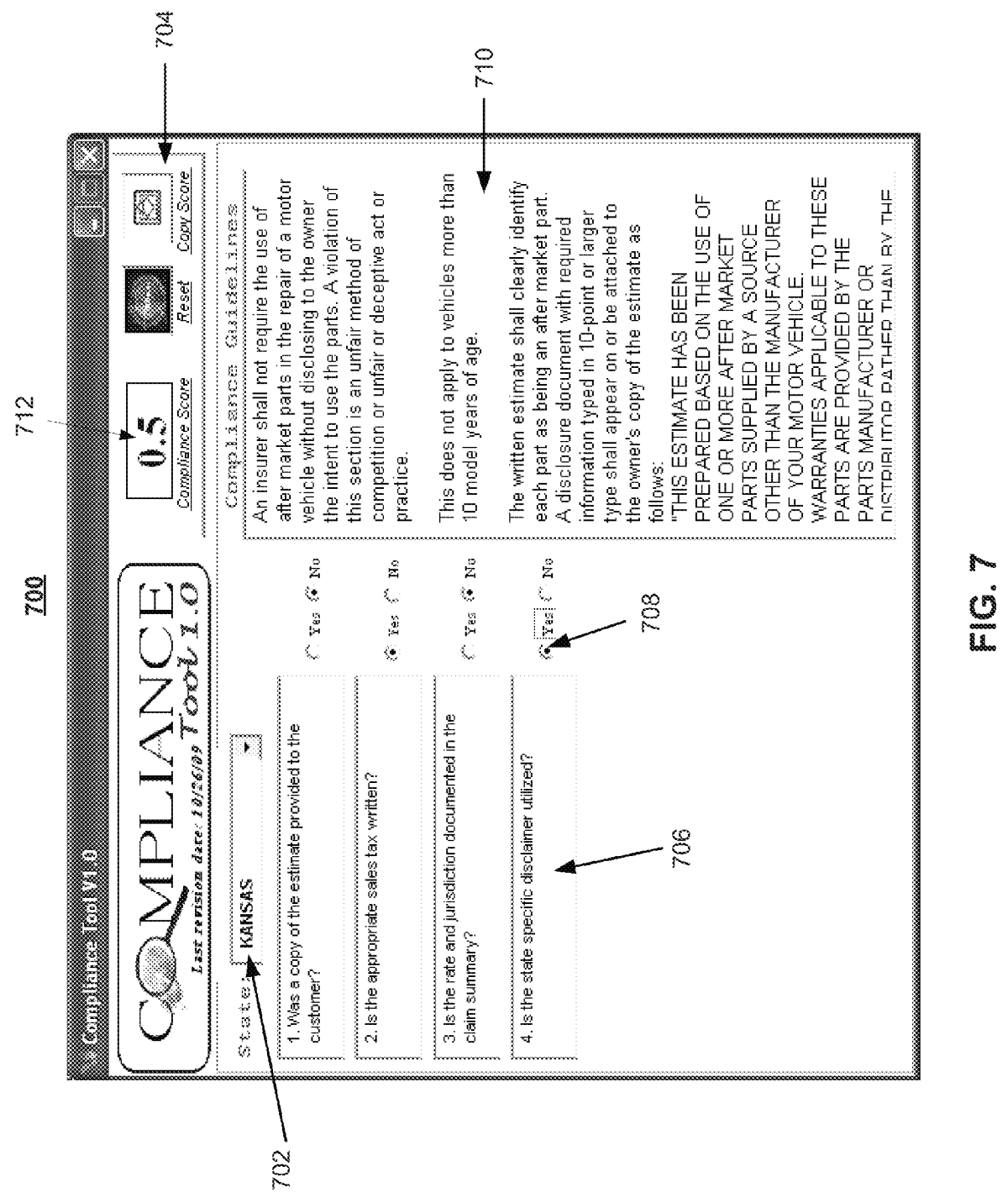

If the system determines that there are relevant auto insurance compliance guidelines, for example based on geographic information provided in the initial and/or first claim data, the system proceeds to step 308, where it modifies the user interface based on the first claim data and the relevant auto insurance compliance guidelines. In some embodiments, the system modifies the user interface by adding questions and corresponding data fields related to the relevant auto insurance compliance guidelines. For example, the system may add questions asking if particular guidelines have been met, and/or add data fields for data required by particular guidelines. Similarly, questions and/or data fields that are present in the user interface may be removed if the relevant guidelines do not require those questions/data fields. In some embodiments, existing data fields or questions that are not relevant/required may be blacked/grayed out or rendered unselectable instead of being removed. The system may also modify the user interface to display the relevant compliance guidelines or steps required to satisfy relevant compliance guidelines, e.g. in data field 406 (FIG. 4) or data field 710 (FIG. 7).

After the user interface has been modified in step 308 based on the first claim data and relevant auto insurance compliance guidelines, or if the system determines in step 306 that there are no relevant auto insurance compliance guidelines, the system proceeds to step 310, where it determines, based on any of the previously collected data, if there is relevant policy data stored in one or more databases in the computer system, for example, in database(s) 220 (FIG. 2). Policy data includes information about the provisions or contractual terms included within particular insurance policies that the insurance company 102 offers, information about policy holders, and historical information about insurance claims. If the system determines that there is relevant policy data, the system proceeds to step 312, where it retrieves the relevant policy data and modifies the user interface based on the retrieved policy data. The modification of the user interface may involve, as described above, adding and/or removing questions/data fields to or from the user interface, depending on whether additional information is needed to process the claim or whether certain questions are extraneous. Optionally, the system modifies the user interface by automatically populating data fields in the user interface with the retrieved policy data. For example, if the user has indicated that the claimant has a particular insurance policy, the system may automatically retrieve relevant information about that particular insurance policy, and may populate data fields with the retrieved information. The retrieved information may include, for example, policy limits, rental coverage, and/or policy deductibles. As another example, if the user inputs the claimant's name, the system may automatically look up information about the claimant/policy holder and automatically populate data fields for claimant information. As yet another example, the system may automatically look up historical claim information based on data already input, and populate data fields for, for example, estimated costs with estimates based on the historical claim information. The auto-population of data fields streamlines the data entry process and reduces the chances of user input error.

After the system has modified the user interface based on relevant policy data in step 312, or if the system determined that there was not relevant policy data in step 310, the system proceeds to step 314, where it determines if data entry is complete. The system may automatically determine if data entry is complete, by determining if all of the data fields have been populated. Optionally, the user may indicate that data entry is complete by, for example, clicking a "done" button. If data entry is not complete, the system proceeds back to step 304, where it receives more auto insurance claim data. In some embodiments, if data entry is complete, the system completes the workflow adjustment process after step 314. In other embodiments, if data entry is complete, the system proceeds to step 316, where it determines an overall claim compliance score based on the entered data. The system determines the compliance score by comparing the entered data with the relevant compliance guidelines determined in step 306 and determining how many of the compliance guidelines have been met. For example, if there are five relevant compliance guidelines, the system determines, based on the entered data, how many of those five guidelines have been met, and generates a score based on that determination. In some embodiments, the contribution of each guideline to the overall score may be weighted equally. For example, if all five guidelines have been met, the system may generate a compliance score of 100, whereas if only three guidelines have been met, the system may generate a compliance score of 60. Optionally, the contribution of each guideline to the overall score may be weighted differently. For example, if a compliance guideline is particularly important, it may be weighted higher than other compliance guidelines.

After the compliance score has been calculated in step 316, the system proceeds to step 318, where the received/determined data is stored. The system stores the data in one or more data storage devices associated with the computer system, such as data storage device 214 (FIG. 2). For example, the system may store the data in the database(s) 220. In some embodiments, the data may be stored in the same database(s) that the policy data is stored in. The system may process the received/determined data into a particular format for storage. For example, the system may process and store the data in a common data format, regardless of the relevant jurisdiction, which may simplify claims processing. In some embodiments, a user may use output options 404 (FIG. 4), 504 (FIG. 5), and/or 604 (FIG. 6) to manually output the received/determined data. For example, the output options may allow a user to copy the data to other applications, tools, and/or user interfaces, or may allow a user to transmit the data to another user or system.

The system then proceeds to step 320, where it adjusts the insurance claim workflow based on the received/determined data. For example, the system may determine, based on the collected data, that a different claims department would be better suited for processing the claim, and may transfer the claim to that claims department. If the compliance score calculated in step 316 indicated that some compliance guidelines have not been met, the system may provide recommendations for next steps to be taken, e.g. additional data that needs to be collected in order to meet the missed compliance guidelines. In some embodiments, the system may provide recommendations other than those related to compliance guidelines, e.g. setting up follow-up appointments or arranging for appraisal. These recommendations may take the form of items on a to-do list. In some embodiments, the system may modify the user interface to display these to-do items, so that the future users/operators (or the same operator) can take appropriate action.

The system may also take steps to modify a relationship with a vendor, an employee, and/or a service provider based on the compliance score. For example, if all compliance guidelines have been met, the system may provide a positive indication for the vendors, employees, and/or service providers involved in that particular claim. Positive indications may include recommendations for promotion, recommendations for pay increases, recommendations for bonuses, and/or positive performance reviews. If compliance guidelines have not been met, the system may provide a negative indication for the vendors, employees, and/or service providers involved in that particular claim. Negative indications may include recommendations for specific improvements to be made by the vendor, employee, or service provider, demotions, pay decreases, and/or termination of employment/relationships. In alternative embodiments, one or more of the indications are automatically executed.

FIG. 4 depicts a user interface for a multi jurisdictional claims processing/customer service tool/application 400, according to an illustrative embodiment. The claims processing application 400 is used to determine the appropriate claims information that should be collected for a particular claim, as well as the particular compliance guidelines that must be followed, based on claimant/incident jurisdiction. For example, upon selection of a geographic locale via data field 402, relevant compliance guidelines may be provided in data field 406. Other data fields in the user interface may be populated or grayed-out/made unselectable, based on the entered information. In some embodiments, the special instructions application 500 may be processed and/or stored in a common data format and then be either manually or automatically transmitted to claims processing personnel. For example, the data entered into the application 500 may be stored in a database (e.g., database(s) 220), and when claims processing personnel are processing the relevant claim, the stored data may be used to adjust the claims processing workflow described above in relation to FIG. 3.

FIG. 5 depicts a user interface for a special instructions determination tool/application 500, according to an illustrative embodiment. The special instructions application 500 is used to determine if particular insurance policies have particular features or instructions that must be followed, by for example, external vendors or adjusters. Claims processing personnel enter the appropriate data into data fields 502, and the system processes the entered data and provides any relevant special instructions. The special instructions application 500 may be linked to the appraiser tool 600, described below, when a third-party appraiser is involved. In some embodiments, the special instructions application 500 may be processed and/or stored in a common data format and then be either manually or automatically transmitted to claims processing personnel. For example, the data entered into the application 500 may be stored in a database (e.g., database(s) 220), and when claims processing personnel are processing the relevant claim, the stored data may be used to adjust the claims processing workflow described above in relation to FIG. 3.

Figure 6A:

FIGS. 6A-F depict user interface screens associated with an appraisal tool/application 600, according to an illustrative embodiment. The appraisal application 600 is used to enter appraisal data associated with auto insurance claims, and may be used by an in-house appraiser working for an insurance company, or by a third-party appraiser. In some embodiments, the appraisal data is entered after an appraiser evaluates the vehicle involved in the incident. The appraisal application 600 may be used to schedule appointments with the customer/claimant and/or the repair shop. Data entered into the appraiser tool 600, via the user interfaces depicts in FIGS. 6A-F, may be processed and/or stored in a common data format and then be either manually or automatically transmitted to claims processing personnel. For example, the data entered into the appraisal application 600 may be stored in a database (e.g., database(s) 220), and when claims processing personnel are processing the relevant claim, the stored data may be used to adjust the claims processing workflow described above in relation to FIG. 3. In some embodiments, the entered data is processed to adhere to a common data format and attached to a claims file that is then transmitted to a different application or stored in a database (e.g., database(s) 220). FIG. 6A depicts a repairable vehicle user interface, in which an appraiser enters data associated with a repairable vehicle. Such data may include contact information, inspection/damage notes, alternate parts suggestions, price/deductible information, as well as special instructions. The repairable vehicle user interface, as well as the other user interfaces associated with application 600, may also include data fields relevant to compliance guidelines. For example, the user interface may ask if estimates have been provided to the vehicle owner, which compliance guidelines in certain states require.

Figure 6B:
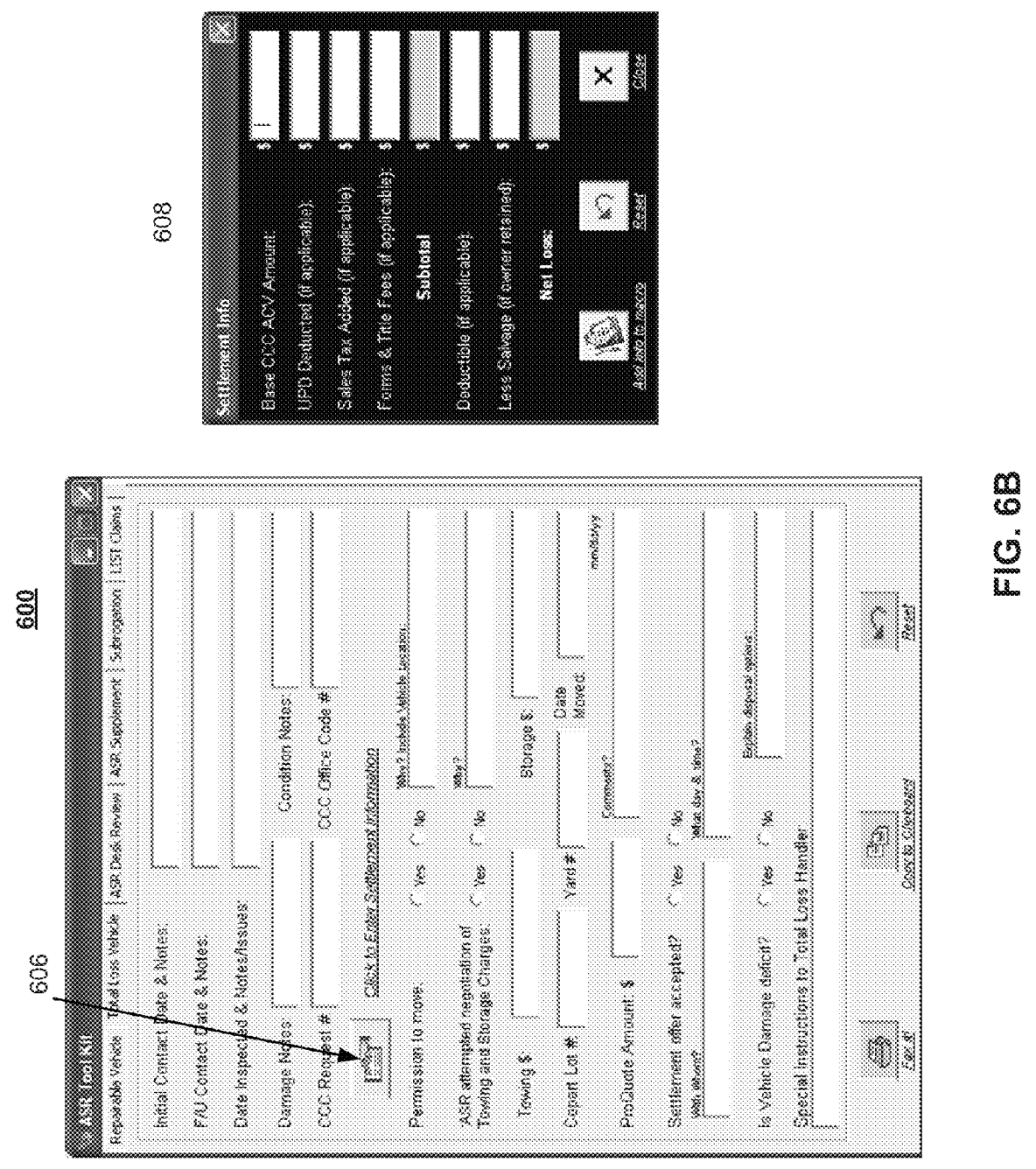
Figure 6C:
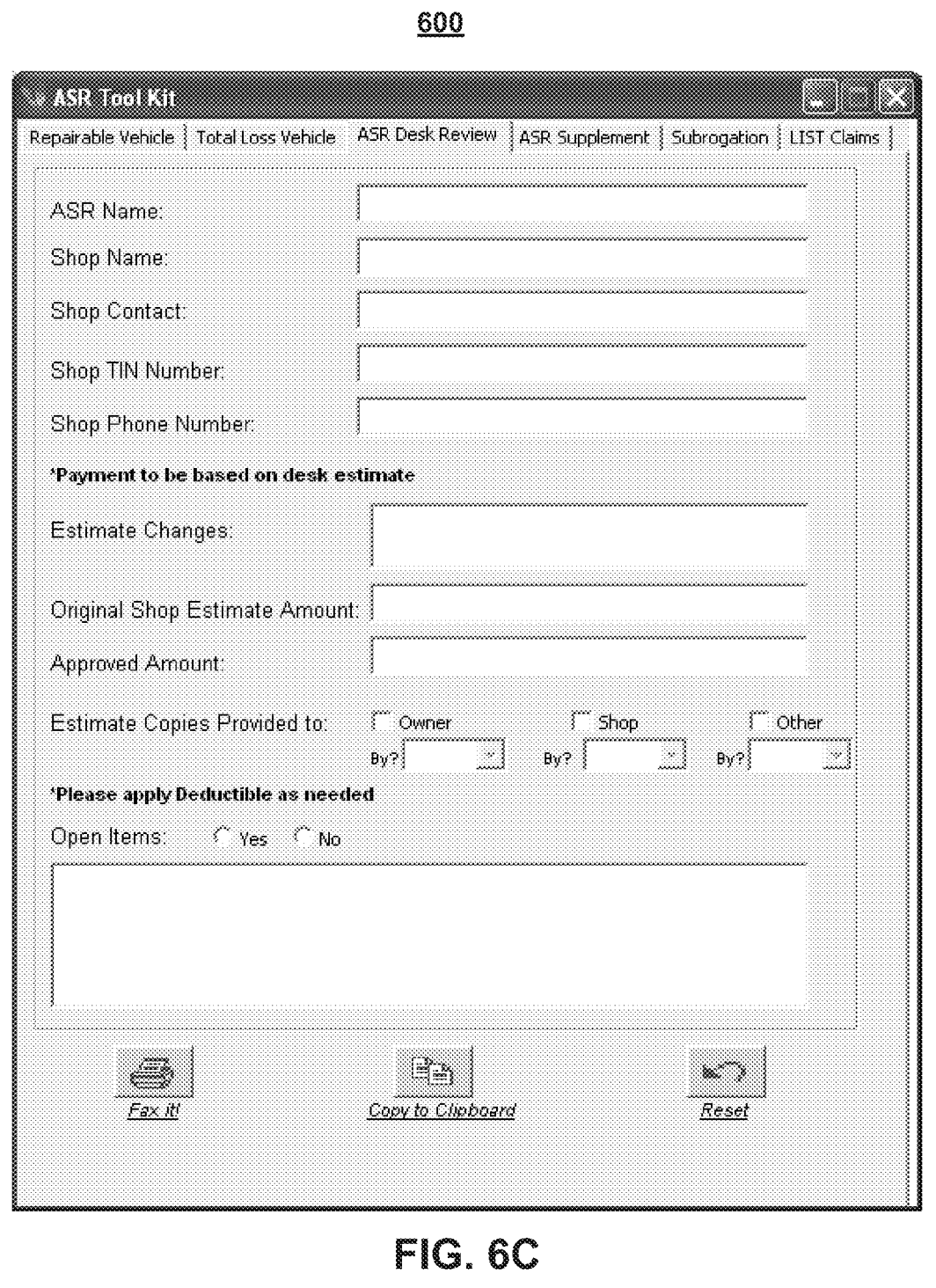
Figure 6D:
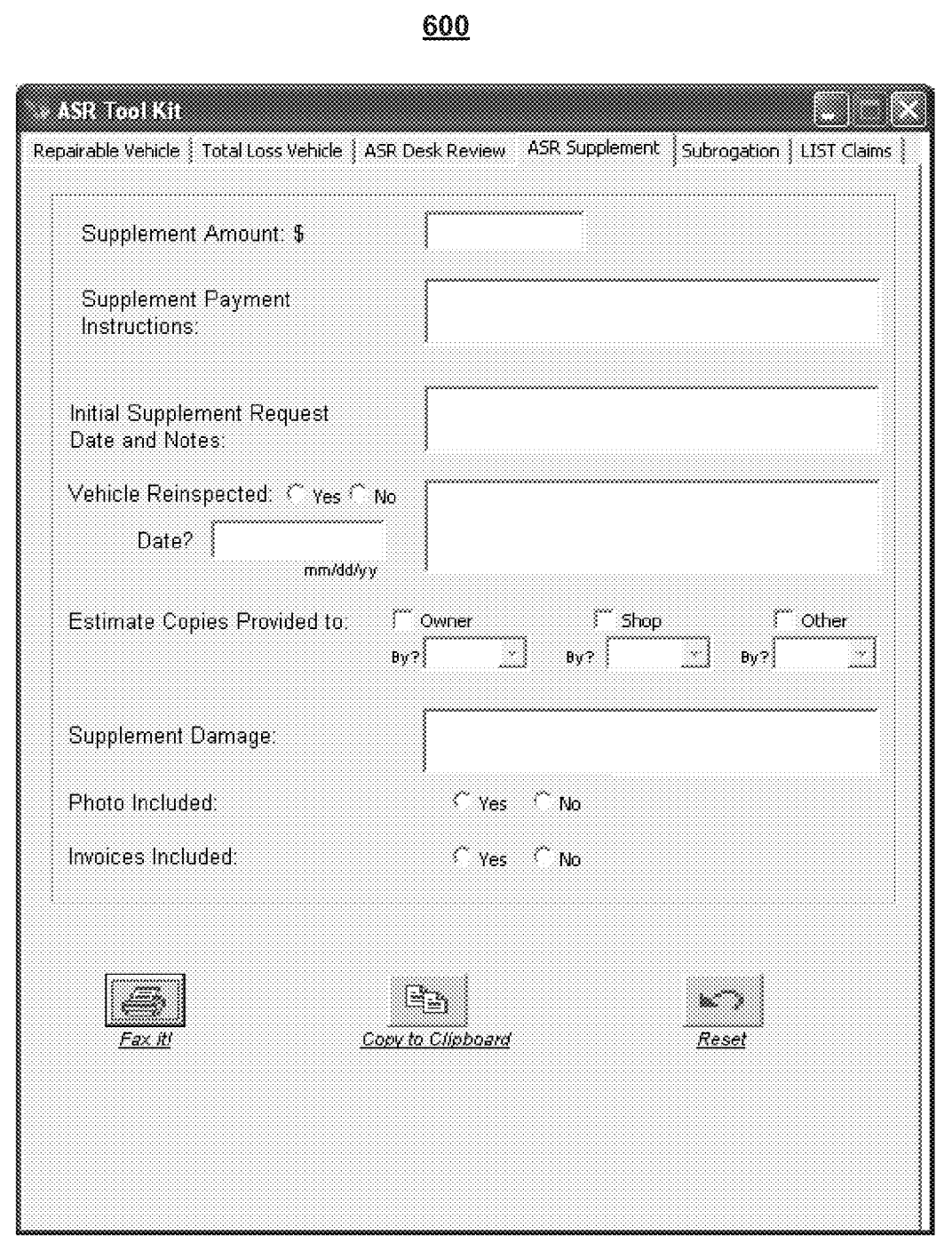
Figure 6E:
Figure 6F:

FIG. 6B depicts a total loss vehicle user interface, in which an appraiser enters data associated with a total loss vehicle. Such information may be similar to the information associated with a repairable vehicle, but may also include settlement information (entered via user interface 608) and moving/storage information. FIG. 6C depicts a shop information user interface, in which an appraiser can enter information regarding a repair shop associated with the claim. FIG. 6D depicts a supplemental damage information user interface, in which an appraiser can enter information associated with any supplemental damage that occurred to the relevant vehicle, as well as provide information such as photographs and invoices. FIG. 6E depicts an OVC (other vehicle carrier)/subrogation user interface, in which an appraiser can enter information associated with OVC, such as demand amounts and vehicle rental costs. This user interface is designed for addressing claims for which a different carrier is seeking subrogation against the carrier using the user interface. FIG. 6F depicts a low-impact soft tissue (LIST) claim user interface, in which an appraiser can enter information associated with impact incidents.

FIG. 7 depicts a user interface for a compliance tool/calculator 700, according to an illustrative embodiment. The tool may be used to measure the degree of compliance of a given service provider (e.g., employee, agent, appraiser, estimator, etc.). For example, a user may use the tool 700 to evaluate a degree of compliance for a set of claims handled by the service provider to calculate an average compliance score or to tally a number of incidents with compliance scores that fall below a predetermined threshold. As indicated above, this information may then be used to reward, reprimand, terminate, or provide instructions to the service provider.

A user may manually enter the geographic locale relevant to a particular claim, for example in data field 702, and the system provides questions based on auto insurance compliance guidelines for that particular locale in fields 706. The user may provide answers to the questions by data input in fields 708. As shown in the user interface, the system may also modify the user interface to display the particular auto insurance compliance guidelines that are applicable, for example by displaying the guidelines in field 710. Based on the answers provided by the user, the system determines a claim compliance score, displayed in field 712. As above, the compliance score may be based on the number of compliance guidelines that have been met, and the contribution of each guideline to the overall score may be evenly weighted or weighted differently. The determined score may then be stored, as described below in relation to step 316, or may be manually output via output options 704. For example, output options 704 may allow a user to copy the determined compliance score for entry into data fields in other applications, tools, or user interfaces.

Each of the tools described above (the claims processing tool 400, the special instructions tool 500, the appraiser tool 600, and/or the compliance tool 700) may be linked to each other. For example, data entered in the claims processing tool 400 may automatically (or manually) be stored and/or transmitted to other relevant tools. As one example, data entered in the special instructions tool 500 may be used to automatically populate or modify data fields in the appraiser tool 600, which may then automatically populate or modify data fields in the claims processing tool 400 and/or the compliance tool 700. In some embodiments, each of the tools populates a shared data store, such as database(s) 220 (FIG. 2) with entered/received information in a common data format. In another embodiment, each of the tools, and the user interfaces they provide, are part of a single integrated application. Alternatively, the tools and user interfaces may be implemented through discrete applications, each configured to interoperate with the other applications or with a central system or application.

The invention may be embodied in other specific forms without departing from the spirit or essential characteristics thereof. The foregoing embodiments are therefore to be considered in all respects illustrative, rather than limiting of the invention.

The invention claimed is:

1. A system for managing an auto insurance claim workflow for a claims department with a plurality of auto insurance claims processing applications, comprising:
  a first data store storing auto insurance compliance guidelines for compliance with government-issued laws and regulations for a plurality of jurisdictions, the auto insurance compliance guidelines comprising identifying jurisdictions having requirements for providing customers with a copy of repair estimates and jurisdictions having requirements for explicitly disclosing to customers any use of after market parts;
  a second data store storing policy data for a plurality of auto insurance policies; and
  a computer processor configured to
    use a first of the plurality of auto insurance claims processing applications to: output an auto insurance data collection user interface containing at least one data field requesting information about an auto insurance claim for display on a display device; receive first data associated with the auto insurance claim via the auto insurance data collection user interface;
    determine, based on the received first data associated with the auto insurance claim, one of the plurality of jurisdictions applicable to the auto insurance claim;
    retrieve auto insurance compliance guidelines applicable to the auto insurance claim from the first data store, based at least on the determined jurisdiction;
    modify the auto insurance data collection user interface by at least one of adding additional data fields or removing data fields based on the retrieved auto insurance compliance guidelines and the first data associated with the auto insurance claim;
    retrieve auto insurance policy data applicable to the auto insurance claim from the second data store, based on the first data associated with the auto insurance claim;
    populate data fields included in the auto insurance data collection user interface with the retrieved auto insurance policy data;
    receive second data associated with the auto insurance claim via the modified auto insurance data collection user interface; and
    output the first data associated with the auto insurance claim,
    use a second of the auto insurance claims processing applications to retrieve data representative of at least a portion of the first data associated with the auto insurance claim;
    compare each of the auto insurance compliance guidelines with the data collected via the auto insurance data collection user interface to determine how many of the auto insurance compliance guidelines have been met;
    determine a compliance score indicative of compliance with the retrieved auto insurance compliance guidelines and associated with the auto insurance claim, using a formula incorporating a number of the auto insurance compliance guidelines determined to be met and a total number of the retrieved auto insurance guidelines; and
    use the determined compliance score to adjust an auto insurance claim workflow.

2. The system of claim 1, wherein the auto insurance policy data comprises at least one of policy holder data, claim data, and policy provision data.

3. The system of claim 1, wherein the processor is configured to store data collected via the auto insurance data collection user interface in the second data store according to a common data format.

4. The system of claim 1, wherein adjusting the auto insurance claim workflow comprises transferring the auto insurance claim to a different claims department.

5. The system of claim 1, wherein adjusting the auto insurance claim workflow comprises providing recommendations for next steps in the auto insurance claim workflow.

6. The system of claim 5, wherein the recommendations include items in a to-do list.

7. The system of claim 1, wherein the processor is configured to modify a relationship with at least one of a vendor, an employee, and a service provider based on the compliance score.

8. The system of claim 1, wherein the second data store comprises a plurality of databases including at least one of a policy holder information database, a policy provisions database, and a claims information database.

9. The system of claim 1, wherein the plurality of auto insurance claims processing applications includes at least one of a call center application, an appraisal application, an instruction determination application, and a compliance calculator.

10. A computerized method for managing an auto insurance claim workflow for a claims department with a plurality of auto insurance claims processing applications, comprising:
  storing auto insurance compliance guidelines for compliance with government-issued laws and regulations for a plurality of jurisdictions in a first data store, the auto insurance compliance guidelines comprising identifying jurisdictions having requirements for providing customers with a copy of repair estimates and jurisdictions having requirements for explicitly disclosing to customers any use of after market parts;
  storing policy data for a plurality of auto insurance policies in a second data store;
  using a first of the auto insurance claims processing applications to:
    output, by a computer processor, an auto insurance data collection user interface containing at least one data field requesting information about an auto insurance claim for display on a display device;

receive, by the computer processor and via the auto insurance data collection user interface, first data associated with the auto insurance claim;

determine, by the computer processor and based on the received first data associated with the auto insurance claim, one of the plurality of jurisdictions applicable to the auto insurance claim;

retrieve, by the computer processor, auto insurance compliance guidelines applicable to the auto insurance claim from the first data store, based at least on the determined jurisdiction;

modify, by the computer processor, the auto insurance data collection user interface by at least one of adding additional data fields or removing data fields based on the retrieved auto insurance compliance guidelines and the first data associated with the auto insurance claim;

retrieve, by the computer processor, auto insurance policy data applicable to the auto insurance claim from the second data store, based on the first data associated with the auto insurance claim;

populate data fields included in the auto insurance data collection user interface with the retrieved auto insurance policy data;

receive second data associated with the auto insurance claim via the modified auto insurance data collection user interface; and output, by the computer processor, the first data associated with the auto insurance claim;

using, by the computer processor, a second of the claims processing applications to retrieve at least a portion of the first data received via the auto insurance data collection user interface;

comparing, by the computer processor, each of the auto insurance compliance guidelines with the data collected via the auto insurance data collection user interface to determine how many of the auto insurance compliance guidelines have been met;

determining, by the computer processor, a compliance score indicative of compliance with the retrieved auto insurance compliance guidelines and associated with the auto insurance claim, using a formula incorporating a number of the auto insurance compliance guidelines determined to be met and a total number of the retrieved auto insurance guidelines; and using, by the computer processor, the determined compliance score to adjust an auto insurance claim workflow.

11. The method of claim 10, wherein the auto insurance policy data comprises at least one of policy holder data, claim data, and policy provision data.

12. The method of claim 10, comprising storing, by the processor, data collected via the auto insurance data collection user interface in the second data store according to a common data format.

13. The method of claim 10, wherein adjusting the auto insurance claim workflow comprises transferring the auto insurance claim to a different claims department.

14. The method of claim 10, wherein adjusting the auto insurance claim workflow comprises providing recommendations for next steps in the auto insurance claim workflow.

15. The method of claim 14, wherein the recommendations include items in a to-do list.

16. The method of claim 10, comprising identifying for future modification, via the processor, a relationship to at least one of a vendor, an employee, and a service provider based on the compliance score.

17. The method of claim 10, wherein the second data store comprises a plurality of databases including at least one of a policy holder information database, a policy provisions database, and a claims information database.

18. The method of claim 10, wherein the plurality of claims processing applications includes at least one of a call center application, an appraisal application, an instruction determination application, and a compliance calculator.

19. A non-transitory computer readable medium storing computer executable instructions, which, when executed by a computer processor, cause the computer processor to carry out a method comprising:

storing auto insurance compliance guidelines for compliance with government-issued laws and regulations for a plurality of jurisdictions in a first data store, the auto insurance compliance guidelines comprising identifying jurisdictions having requirements for providing customers with a copy of repair estimates and jurisdictions having requirements for explicitly disclosing to customers any use of after market parts;

storing policy data for a plurality of auto insurance policies in a second data store;

using a first auto insurance claims processing application to:

output, by a computer processor, an auto insurance data collection user interface containing at least one data field requesting information about an auto insurance claim for display on a display device;

receive, by the computer processor and via the auto insurance data collection user interface, first data associated with the auto insurance claim;

determine, by the computer processor and based on the received first data associated with the auto insurance claim, one of the plurality of jurisdictions applicable to the auto insurance claim;

retrieve, by the computer processor, auto insurance compliance guidelines applicable to the auto insurance claim from the first data store, based at least on the determined jurisdiction;

modify, by the computer processor, the auto insurance data collection user interface by at least one of adding additional data fields or removing data fields based on the retrieved auto insurance compliance guidelines and the first data;

retrieve, by the computer processor, auto insurance policy data applicable to the auto insurance claim from the second data store, based on the first data;

populate data fields included in the auto insurance data collection user interface with the retrieved auto insurance policy data;

receive second data associated with the auto insurance claim via the modified auto insurance data collection user interface; and output, by the computer processor, the first data associated with the auto insurance claim;

using a second auto insurance claims processing application to retrieve at least a portion of the first data associated with the auto insurance claim;

comparing each of the auto insurance compliance guidelines with the data collected via the auto insurance data collection user interface to determine a number of auto insurance compliance guidelines that have been met;

determining a compliance score indicative of compliance with the retrieved auto insurance compliance guidelines and associated with the auto insurance claim, using a formula incorporating the number of the auto insurance compliance guidelines determined to be met and a total number of the retrieved auto insurance guidelines; and using the determined compliance score to adjust an insurance claim workflow.

20. The non-transitory computer readable medium of claim 19, wherein the method comprises storing, by the processor, data collected via the auto insurance data collection user interface in the second data store according to a common data format.

21. The non-transitory computer readable medium of claim 20, wherein the adjusting the insurance claim workflow comprises:

transferring, by the processor, the auto insurance claim to a different claims department.

* * * * *